US012695559B2

(12) United States Patent
Jiang et al.

(10) Patent No.: US 12,695,559 B2
(45) Date of Patent: Jul. 28, 2026

(54) RRC SIGNALING IN NTN WIRELESS NETWORKS

(71) Applicant: Apogee 5G Global, LLC, Plano, TX (US)

(72) Inventors: Qi Jiang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 386 days.

(21) Appl. No.: 17/740,372

(22) Filed: May 10, 2022

(65) Prior Publication Data

US 2022/0271885 A1 Aug. 25, 2022

Related U.S. Application Data

(63) Continuation of application No. PCT/CN2020/124722, filed on Oct. 29, 2020.

(30) Foreign Application Priority Data

Nov. 21, 2019 (CN) .......................... 201911151113.0

(51) Int. Cl.
*H04B 7/185* (2006.01)
*H04L 5/00* (2006.01)
(Continued)

(52) U.S. Cl.
CPC ........... *H04L 5/0037* (2013.01); *H04B 7/185* (2013.01); *H04L 5/0048* (2013.01); *H04L 5/006* (2013.01);
(Continued)

(58) Field of Classification Search
CPC ..... H04L 5/0037; H04L 5/0048; H04L 5/006; H04L 5/0073; H04L 5/0094; H04L 1/00;
(Continued)

(56) References Cited

U.S. PATENT DOCUMENTS 11,991,113 B2 * 5/2024 Manolakos ........... H04L 5/0053
2007/0242636 A1 10/2007 Kashima
(Continued)

FOREIGN PATENT DOCUMENTS

CN 101083562 A 12/2007
CN 104038320 A 9/2014
(Continued)

OTHER PUBLICATIONS

ISR received in application No. PCT/CN2020/124722 dated Jan. 27, 2021.
(Continued)

*Primary Examiner* — Faruk Hamza
*Assistant Examiner* — Aixa A Guadalupe Cruz
(74) *Attorney, Agent, or Firm* — Volpe Koenig

(57) ABSTRACT

A method and a device in a node used for wireless communications. A first node firstly receives first information in a first time window, the first information being used to determine a first time interval length; and then receives second information in a second time window; and first operates a target signal in a target time-frequency resource set; a time-domain resource occupied by the target time-frequency resource set belongs to one of the K1 time windows; a time interval length between any two of the K1 time windows which are adjacent in time domain is equal to the first time interval length; when the second time window is one of the K1 time windows, the second information can be used to determine configuration information for the target signal. By streamlining configurations for higher-layer signaling in NTN communications, the present disclosure can reduce the control information payload.

18 Claims, 6 Drawing Sheets

(51) Int. Cl.
    *H04W 64/00*        (2009.01)
    *H04W 72/20*        (2023.01)

(52) U.S. Cl.
    CPC ........... *H04L 5/0073* (2013.01); *H04W 64/00*
        (2013.01); *H04W 72/20* (2023.01); *H04B*
        *7/1851* (2013.01)

(58) Field of Classification Search
    CPC ... H04L 5/0053; H04B 7/185; H04B 7/18506;
        H04B 7/1851; H04W 72/04; H04W
        72/0446; H04W 72/0453; H04W 72/23
    See application file for complete search history.

(56)          References Cited

U.S. PATENT DOCUMENTS

| | | | | |
|---|---|---|---|---|
| 2012/0053902 | A1 | 3/2012 | Garrison Stuber | |
| 2017/0303220 | A1 | 10/2017 | Sadeghi | |
| 2022/0014330 | A1* | 1/2022 | Zhang | H04L 5/0048 |
| 2022/0030532 | A1* | 1/2022 | Hajir | H04B 7/18513 |
| 2022/0217033 | A1* | 7/2022 | Zhou | H04B 7/18519 |
| 2022/0225119 | A1* | 7/2022 | Liberg | H04B 7/18513 |
| 2022/0264417 | A1* | 8/2022 | Zhou | H04W 36/322 |
| 2022/0416961 | A1* | 12/2022 | Frenne | H04B 7/0452 |
| 2023/0284060 | A1* | 9/2023 | Euler | H04W 24/10 |
| | | | | 370/329 |
| 2023/0403661 | A1* | 12/2023 | Kim | H04W 56/001 |

FOREIGN PATENT DOCUMENTS

| | | | | |
|---|---|---|---|---|
| CN | 104901775 | A | 9/2015 | |
| CN | 107769825 | A | 3/2018 | |
| CN | 109699051 | A | 4/2019 | |
| CN | 110098892 | A | 8/2019 | |
| CN | 110167186 | A | 8/2019 | |
| EP | 3629514 | A1 * | 4/2020 | ........... H04L 5/0048 |
| EP | 4354972 | A1 * | 4/2024 | ......... H04L 25/0202 |

OTHER PUBLICATIONS

First Office Action of Chinses patent application No. CN201911151113.0 dated Nov. 1, 2021.

First Search Report of Chinses patent application No. CN201911151113.0 dated Oct. 22, 2021.

Notification to Grant Patent Right for Invention of Chinses patent application No. CN201911151113.0 dated Mar. 21, 2022.

Third Generation Partnership Project, "Technical Specification Group Radio Access Network; NR; Physical layer procedures for control (Release 15)," 3GPP TS 38.213 V15.7.0 (Sep. 2019).

Third Generation Partnership Project, "Technical Specification Group Radio Access Network; NR; Physical layer procedures for data (Release 15)," 3GPP TS 38.214 V15.7.0 (Sep. 2019).

Third Generation Partnership Project, "Technical Specification Group Radio Access Network; NR; Radio Resource Control (RRC) protocol specification (Release 15)," 3GPP TS 38.331 V15.7.0 (Sep. 2019).

* cited by examiner

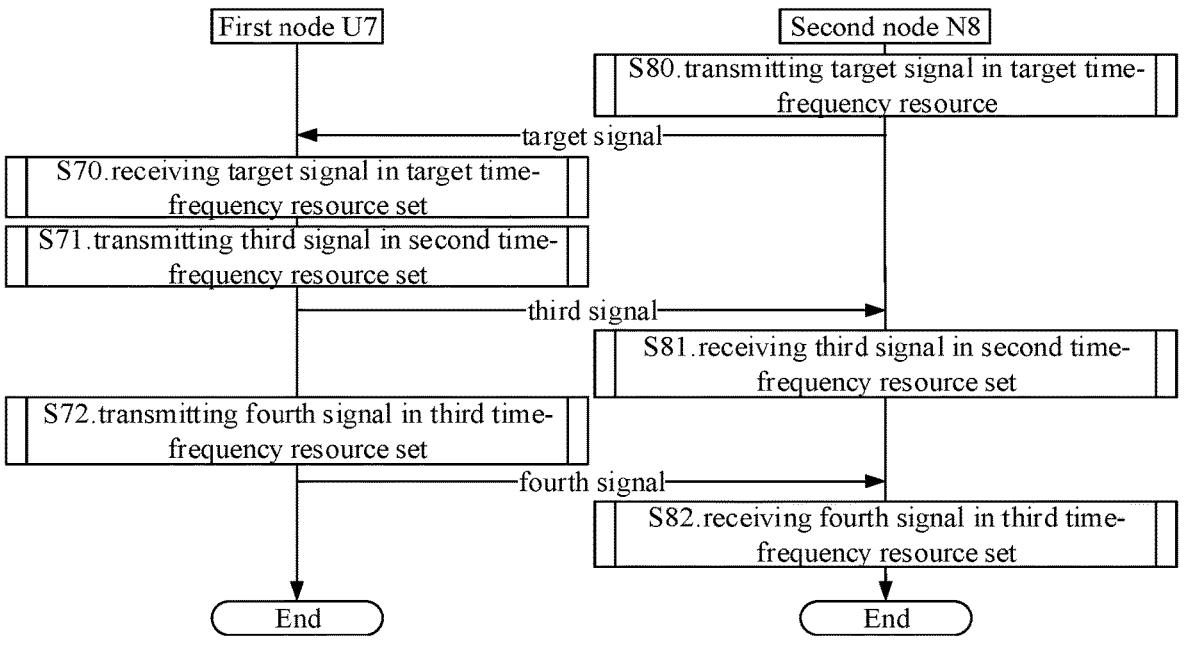

FIG. 8

First transmitter U9

S90.transmitting target signal in target time-frequency resource set

————target signal————→

S100.receiving target signal in target time-frequency resource set

S101.transmitting third signal in second time-frequency resource set

←————third signal————

S91.receiving third signal in second time-frequency resource set

S102.transmitting fourth signal in third time-frequency resource set

←————fourth signal————

S92.receiving fourth signal in third time-frequency resource set

Second node N10

End            End

FIG. 9

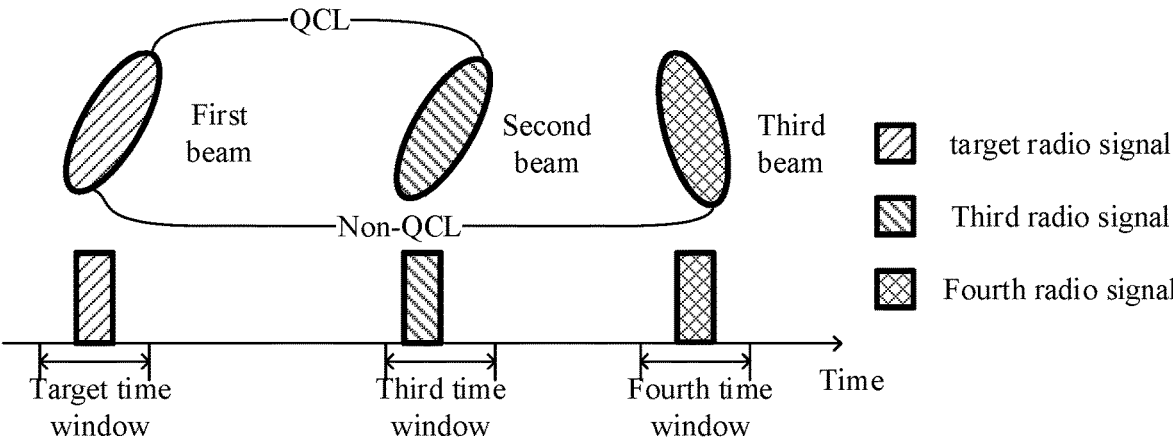
FIG. 13
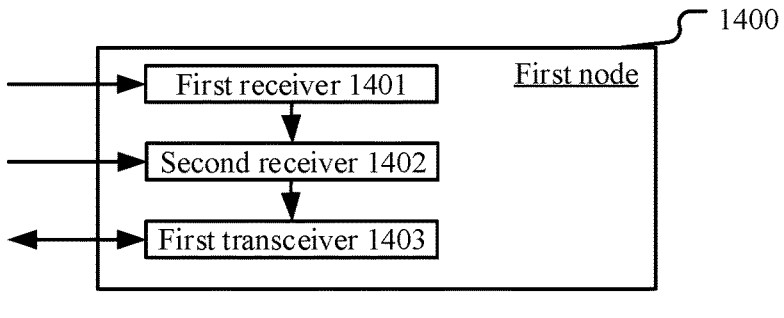
FIG. 14
FIG. 15

RRC SIGNALING IN NTN WIRELESS NETWORKS

CROSS REFERENCE TO RELATED APPLICATIONS

This application is a continuation of International Patent Application No. PCT/CN2020/124722, filed on Oct. 29, 2020, which claims the priority benefit of Chinese Patent Application No. 201911151113.0, filed on Nov. 21, 2019, the full disclosure of which is incorporated herein by reference.

BACKGROUND

Technical Field

The present disclosure relates to transmission methods and devices in wireless communication systems, and in particular to a transmission method and device in Non-Terrestrial Networks (NTN) in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

For better adaptability to diverse application scenarios and fulfillment of various requests, the 3GPP RAN #75 Plenary approved a study item of Non-Terrestrial Networks (NTN) under NR, which was started with R15 of Technical Specifications. And later at the 3GPP RAN #79 Plenary, a decision was made on studies of schemes in NTN and a follow-up WI was initiated in R16 or R17 to standardize relevant techniques.

SUMMARY

In Non-Terrestrial Network (NTN), a User Equipment (UE) is in communication with either a satellite or an aircraft via 5G networks, since a distance from the satellite or the aircraft to the UE is much larger than a distance from a terrestrial base station to the UE, there will be a long Propagation Delay in communications between the satellite or aircraft and the UE. Besides, when the satellite is used as a relay for the terrestrial base station, the delay in a Feeder Link between the satellite and the terrestrial station will further enlarge the propagation delay between the UE and the base station, so that method adopted in the current system to establish Radio Resource Control (RRC) connection through multiple uplink-downlink interactions usually brings about relatively greater access delay. For satellites with a fast traveling speed like low-orbit satellite, however, because its flight trajectory is relatively fixed, we can make some progress in the transmission of the currently configured parameters based on such a predictable trajectory to enhance the reception performance and efficiency of configuration information.

To address the above problem, the present disclosure provides a solution. It should be noted that although the description above only takes NTN scenarios as an example of application scenario in the scheme proposed herein; the present disclosure is also applicable to scenarios of terrestrial network scenarios, where similar technical effects can be achieved. Similarly, the present disclosure also applies to scenarios where, for instance, Unmanned Aerial Vehicle (UAV) or IoT equipment is provided, to achieve similar technical effects. Additionally, the adoption of a unified solution for various scenarios, including but not limited to NTN and TN scenarios, contributes to the reduction of hardcore complexity and costs.

It should be noted that in the case of no conflict, the embodiments of a first node and the characteristics in the embodiments may be applied to a second node, and vice versa. What's more, the embodiments in the present disclosure and the characteristics in the embodiments can be arbitrarily combined if there is no conflict.

The present disclosure provides a method in a first node for wireless communications, comprising:

receiving first information in a first time window, the first information being used to determine a first time interval length;

receiving second information in a second time window; and receiving a target signal in a target time-frequency resource set;

herein, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

The present disclosure provides a method in a first node for wireless communications, comprising:

receiving first information in a first time window, the first information being used to determine a first time interval length;

receiving second information in a second time window; and transmitting a target signal in a target time-frequency resource set;

herein, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

In one embodiment, an advantage of the above method is that when the second time window is one of the K1 time windows, the second information can be applied for a radio signal transmitted in the K1 time windows; thus, the first node will only be required to receive configuration information for the radio signal in the second time window, for avoidance of waste of the higher signaling.

In one embodiment, another advantage of the above method is that a transmitter for the first information is a second node, the K1 time windows corresponding to an orbit of the second node, namely, within any time window among the K1 time windows, the second node provides services for the first node, but, at any time outside the K1 time windows, the second node is unable to serve the first node for the sake of running; under such circumstances, the first node can retain the second information without needing to initiate access procedures frequently, and the second node only needs to transmit a higher layer signaling carried by the second information for just once.

In one embodiment, a third advantage of the above method is that the first time interval length corresponds to a cycle for the second node to arrive above the first node, for the first node, the first time interval length can be predicted and notified to the first node for the convenience of the first node's reception of part of relatively stationary higher layer signaling.

According to one aspect of the present disclosure, the above method is characterized in that the first information is used to determine a first parameter group, the first parameter group is used to determine the first time interval length, and the first parameter group comprises at least one of a type corresponding to a transmitter for the first information, a height of a transmitter for the first information, or a moving speed and direction of a transmitter for the first information.

In one embodiment, an advantage of the above method is that when the second node is a satellite, parameters relating to the satellite will influence the determination of the first time interval length.

According to one aspect of the present disclosure, the above method is characterized in that duration time of any time window of the K1 time windows in time domain is equal to a first time value.

According to one aspect of the present disclosure, the above method is characterized in that the first time value is related to the first parameter group.

In one embodiment, an advantage of the above method is that: by associating the first time value and the first parameter group, the bit size (the number of bits) occupied by configuration information for the first time value can be conserved.

According to one aspect of the present disclosure, the above method is characterized in comprising:
receiving a first signal;
herein, the first signal is used to determine a synchronization timing for the K1 time windows.

According to one aspect of the present disclosure, the above method is characterized in comprising:
receiving a second signal;
herein, the second signal is used to determine positional information for the first node, the first time interval length being related to the positional information for the first node.

According to one aspect of the present disclosure, the above method is characterized in that the first time value is related to the positional information for the first node.

In one embodiment, the above method is advantageous in that: by associating the first time interval length, the first time value and the positional information for the first node, the first time interval length can be increased and the precision of the first time value can be enhanced.

According to one aspect of the present disclosure, the above method is characterized in comprising:
receiving a third signal in a second time-frequency resource set;
herein, a time-domain resource occupied by the second time-frequency resource set belongs to one of the K1 time windows, the third signal and the target signal are spatially correlated.

According to one aspect of the present disclosure, the above method is characterized in comprising:
transmitting a third signal in a second time-frequency resource set;
herein, a time-domain resource occupied by the second time-frequency resource set belongs to one of the K1 time windows, the third signal and the target signal are spatially correlated.

According to one aspect of the present disclosure, the above method is characterized in comprising:
receiving a fourth signal in a third time-frequency resource set;
herein, a time-domain resource occupied by the third time-frequency resource set belongs to a time window outside the K1 time windows, the fourth signal and the target signal are spatially uncorrelated.

According to one aspect of the present disclosure, the above method is characterized in comprising:
transmitting a fourth signal in a third time-frequency resource set;
herein, a time-domain resource occupied by the third time-frequency resource set belongs to a time window outside the K1 time windows, the fourth signal and the target signal are spatially uncorrelated.

The present disclosure provides a method in a second node for wireless communications, comprising:
transmitting first information in a first time window, the first information being used to determine a first time interval length;
transmitting second information in a second time window; and
transmitting a target signal in a target time-frequency resource set;
herein, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

The present disclosure provides a method in a second node for wireless communications, comprising:
transmitting first information in a first time window, the first information being used to determine a first time interval length;
transmitting second information in a second time window; and
receiving a target signal in a target time-frequency resource set;

herein, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

According to one aspect of the present disclosure, the above method is characterized in that the first information is used to determine a first parameter group, the first parameter group is used to determine the first time interval length, and the first parameter group comprises at least one of a type corresponding to a transmitter for the first information, a height of a transmitter for the first information, or a moving speed and direction of a transmitter for the first information.

According to one aspect of the present disclosure, the above method is characterized in that duration time of any time window of the K1 time windows in time domain is equal to a first time value.

According to one aspect of the present disclosure, the above method is characterized in comprising:
transmitting a first signal;
herein, the first signal is used to determine a synchronization timing for the K1 time windows.

According to one aspect of the present disclosure, the above method is characterized in comprising:
transmitting a second signal;
herein, the second signal is used to determine positional information for the first node, the first time interval length being related to the positional information for the first node.

According to one aspect of the present disclosure, the above method is characterized in comprising:
transmitting a third signal in a second time-frequency resource set;
herein, a time-domain resource occupied by the second time-frequency resource set belongs to one of the K1 time windows, the third signal and the target signal are spatially correlated.

According to one aspect of the present disclosure, the above method is characterized in comprising:
receiving a third signal in a second time-frequency resource set;
herein, a time-domain resource occupied by the second time-frequency resource set belongs to one of the K1 time windows, the third signal and the target signal are spatially correlated.

According to one aspect of the present disclosure, the above method is characterized in comprising:
transmitting a fourth signal in a third time-frequency resource set;
herein, a time-domain resource occupied by the third time-frequency resource set belongs to a time window outside the K1 time windows, the fourth signal and the target signal are spatially uncorrelated.

According to one aspect of the present disclosure, the above method is characterized in comprising:
receiving a fourth signal in a third time-frequency resource set;

herein, a time-domain resource occupied by the third time-frequency resource set belongs to a time window outside the K1 time windows, the fourth signal and the target signal are spatially uncorrelated.

The present disclosure provides a first node for wireless communications, comprising:
a first receiver, receiving first information in a first time window, the first information being used to determine a first time interval length;
a second receiver, receiving second information in a second time window; and
a first transceiver, receiving a target signal in a target time-frequency resource set;
herein, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

The present disclosure provides a first node for wireless communications, comprising:
a first receiver, receiving first information in a first time window, the first information being used to determine a first time interval length;
a second receiver, receiving second information in a second time window; and
a first transceiver, transmitting a target signal in a target time-frequency resource set;
herein, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

The present disclosure provides a second node for wireless communications, comprising:
a first transmitter, transmitting first information in a first time window, the first information being used to determine a first time interval length;
a second transmitter, transmitting second information in a second time window; and
a second transceiver, transmitting a target signal in a target time-frequency resource set;
herein, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

The present disclosure provides a second node for wireless communications, comprising:

a first transmitter, transmitting first information in a first time window, the first information being used to determine a first time interval length;

a second transmitter, transmitting second information in a second time window; and a second transceiver, receiving a target signal in a target time-frequency resource set;

herein, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

In one embodiment, compared with the prior art, the present disclosure is advantageous in the following aspects:

when the second time window is one of the K1 time windows, the second information can be applied for a radio signal transmitted in the K1 time windows; thus, the first node will only be required to receive configuration information for the radio signal in the second time window, for avoidance of waste resulting from multiple higher layer signaling transmissions;

a transmitter for the first information is a second node, the K1 time windows corresponding to an orbit of the second node, namely, within any time window among the K1 time windows, the second node provides services for the first node, but, at any time outside the K1 time windows, the second node is unable to serve the first node for the sake of running; under such circumstances, the first node can retain the second information without needing to initiate access procedures frequently, and the second node only needs to transmit a higher layer signaling carried by the second information for just once.

the first time interval length corresponds to a cycle for the second node to arrive above the first node, for the first node, the first time interval length can be predicted and notified to the first node for the convenience of the first node's reception of part of relatively stationary higher layer signaling;

when the second node is a satellite, parameters relating to the satellite will influence the determination of the first time interval length; by associating the first time value and the first parameter group, the bit size (the number of bits) occupied by configuration information for the first time value can be conserved.

by associating the first time interval length, the first time value and the positional information for the first node, the first time interval length and the precision of the first time value can be increased.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a flowchart of a target signal according to one embodiment of the present disclosure.

FIG. 9 illustrates a flowchart of a target signal according to one embodiment of the present disclosure.

FIG. 13 illustrates a schematic diagram of spatial correlation according to one embodiment of the present disclosure.

FIG. 14 illustrates a structure block diagram used in a first node according to one embodiment of the present disclosure.

FIG. 15 illustrates a structure block diagram used in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
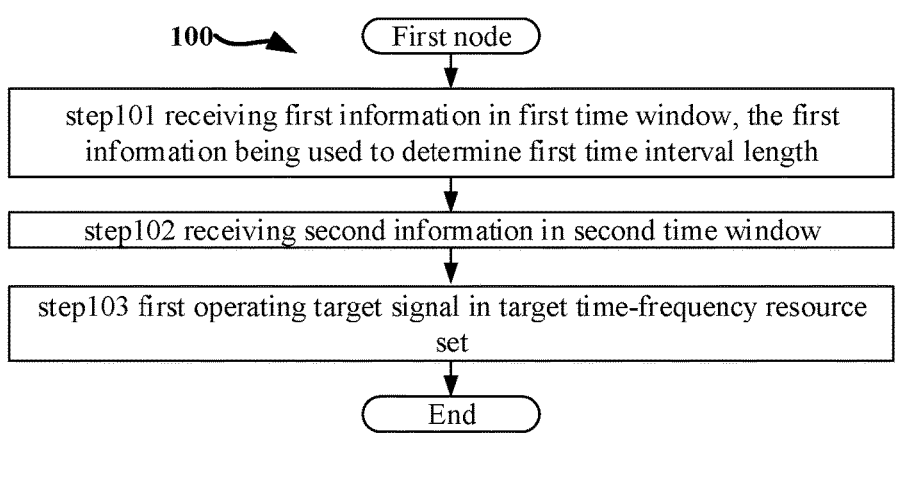
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, the first node in the present disclosure receives first information in a first time window in step 101, the first information being used to determine a first time interval length; receives second information in a second time window in step 102; and first-operates a target signal in a target time-frequency resource set in step 103.

In Embodiment 1, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal; the first-operating is receiving, or the first-operating is transmitting.

In one embodiment, duration time of the first time window in time domain is equal to a positive integer number of slot(s).

In one embodiment, duration time of the second time window in time domain is equal to a positive integer number of slot(s).

In one embodiment, the first time window and the second time window are a same time window among the K1 time windows.

In one embodiment, the first information is an RRC signaling.

In one embodiment, the first information is Cell-Specific.

In one embodiment, the first information is Beam Spot-Specific.

In one embodiment, the first information is a broadcast signaling.

In one embodiment, the first information belongs to a SS/PBCH Block (SSB).

In one embodiment, the first information belongs to a System Information Block (SIB).

In one embodiment, the second information is an RRC signaling.

In one embodiment, the second information is Cell-Specific.

In one embodiment, the second information is Beam Spot-Specific.

In one embodiment, the second information is Zone-Specific.

In one embodiment, the second information is a broadcast signaling.

In one embodiment, the first information and the second information belong to a same RRC signaling.

In one embodiment, the first information and the second information belong to a same Information Element (IE).

In one embodiment, the first information and the second information belong to a same SIB.

In one embodiment, the K1 time windows are discrete.

In one embodiment, a given time window is an i-th time window among the K1 time windows, where i is a positive integer no less than 0 and no greater than K1, a start time for the given time window is equal to $(i-1)*(T1+T2)$, and an end time for the given time window is equal to $[(i-1)*(T1+T2)+T1]$, where T1 and T2 are both measured in milliseconds, and both T1 and T2 are positive real numbers greater than 0.

In one embodiment, a given time window is an i-th time window among the K1 time windows, where i is a positive integer no less than 0 and no greater than K1, a start time for the given time window is equal to $[(i-1)*(T1+T2)+T3]$, and an end time for the given time window is equal to $[(i-1)*(T1+T2)+T1+T3]$, where T1, T2 and T3 are measured in milliseconds, and both T1 and T2 are positive real numbers greater than 0.

In one subembodiment of the above two embodiments, T3 is fixed.

In one subembodiment of the above two embodiments, T3 is related to a downlink timing between the second node in the present disclosure and the first node.

In one subembodiment of the above two embodiments, T3 is related to a timing advance between the first node and the second node in the present disclosure.

In one subembodiment of the above two embodiments, T1 is duration time for any one of the K1 time windows in time domain.

In one subembodiment of the above two embodiments, T2 is equal to the first time interval length.

In one embodiment, the K1 time windows are respectively active time windows for the second information.

In one embodiment, the second information is used to indicate the target time-frequency resource set.

In one embodiment, the target time-frequency resource set is indicated by a dynamic signaling.

In one embodiment, the target time-frequency resource set is indicated through Downlink Control Information (DCI).

In one embodiment, a first bit block is used for generating a target signal and a given signal, the given signal being transmitted in a time window among the K1 time windows other than a time window occupied by the target signal, the target signal and the given signal can be combined.

In one embodiment, a first bit block is used for generating a target signal and a given signal, the given signal being received in a time window among the K1 time windows other than a time window occupied by the target signal, the target signal and the given signal can be combined.

In one embodiment, a first bit block is used for generating a target signal and a given signal, the given signal being transmitted in a time window among the K1 time windows other than a time window occupied by the target signal, the target signal and the given signal are transmitted employing a same antenna port.

In one embodiment, a first bit block is used for generating a target signal and a given signal, the given signal being received in a time window among the K1 time windows other than a time window occupied by the target signal, the target signal and the given signal are received employing a same antenna port.

In one embodiment, a first bit block is used for generating a target signal and a given signal, the given signal being transmitted in a time window among the K1 time windows other than a time window occupied by the target signal, the target signal and the given signal are QCL.

In one embodiment, a first bit block is used for generating a target signal and a given signal, the given signal being received in a time window among the K1 time windows other than a time window occupied by the target signal, the target signal and the given signal are QCL.

In one embodiment, the QCL in the present disclosure is one of QCL-TypeA, QCL-TypeB, QCL-TypeC or QCL-TypeD in TS 38.214.

In one embodiment, the second information comprises first sub-information and second sub-information, where the first sub-information is applied within the K1 time windows, while the second sub-information is applied outside the K1 time windows.

In one embodiment, the second information remains unchanged in the K1 time windows.

In one embodiment, the second information is transmitted in the K1 time windows.

In one embodiment, when the second information is received in any of the K1 time windows, the second information is considered to be valid in any of the K1 time windows.

In one embodiment, when the second information is received in any time window outside the K1 time windows, the second information is valid only in the time window where it is received.

In one embodiment, the second information comprises configuration information for a Channel State Information-Reference Signal (CSI-RS).

In one embodiment, the target signal comprises a CSI-RS.

In one embodiment, the second information comprises a CSI-AperiodicTriggerStateList specified in TS (i.e., Technical Specification) 38.331.

In one embodiment, the second information comprises CSI-FrequencyOccupation in TS 38.331.

In one embodiment, the second information comprises a CSI-IM-Resource in TS 38.331.

In one embodiment, the second information comprises a CSI-IM-ResourceId in TS 38.331.

In one embodiment, the second information comprises a CSI-IM-ResourceSet in TS 38.331.

In one embodiment, the second information comprises a CSI-IM-ResourceSetId in TS 38.331.

In one embodiment, the second information comprises CSI-MeasConfig in TS 38.331.

In one embodiment, the second information comprises CSI-ReportConfig in TS 38.331.

In one embodiment, the second information comprises a CSI-ReportConfigId in TS 38.331.

In one embodiment, the second information comprises CSI-ResourceConfig in TS 38.331.

In one embodiment, the second information comprises a CSI-ResourceConfigId in TS 38.331.

In one embodiment, the second information comprises a CSI-ResourcePeriodicityAndOffset in TS 38.331.

In one embodiment, the second information comprises CSI-RS-ResourceConfigMobility in TS 38.331.

In one embodiment, the second information comprises CSI-RS-ResourceMapping in TS 38.331.

In one embodiment, the second information comprises a NZP-CSI-RS-Resource in TS 38.331.

In one embodiment, the second information comprises a NZP-CSI-RS-ResourceId in TS 38.331.

In one embodiment, the second information comprises a NZP-CSI-RS-ResourceSet in TS 38.331.

In one embodiment, the second information comprises a NZP-CSI-RS-ResourceSetId in TS 38.331.

In one embodiment, the second information comprises a CSI-SemiPersistentOnPUSCH-TriggerStateList in TS 38.331.

In one embodiment, the second information comprises a CSI-SSB-ResourceSet in TS 38.331.

In one embodiment, the second information comprises a CSI-SSB-ResourceSetId in TS 38.331.

In one embodiment, the second information comprises configuration information for a Sounding Reference Signal (SRS).

In one embodiment, the target information comprises an SRS.

In one embodiment, the second information comprises a SRS-CarrierSwitching in TS 38.331.

In one embodiment, the second information comprises SRS-Config in TS 38.331.

In one embodiment, the second information comprises SRS-TPC-CommandConfig in TS 38.331.

In one embodiment, the second information comprises configuration information for a Demodulation Reference Signal (DM-RS).

In one embodiment, the target signal comprises a DM-RS.

In one embodiment, the second information comprises DMRS-DownlinkConfig in TS 38.331.

In one embodiment, the second information comprises DMRS-UplinkConfig in TS 38.331.

In one embodiment, the second information comprises configuration information for a PT-RS.

In one embodiment, the target signal comprises a Phase Tracking Reference Signal (PT-RS).

In one embodiment, the second information comprises configuration information for a Control Resource Set (CORESET).

In one embodiment, a physical layer channel bearing the target signal comprises a Physical Downlink Control Channel (PDCCH).

In one embodiment, the second information comprises a ControlResourceSet in TS 38.331.

In one embodiment, the second information comprises a ControlResourceSetId in TS 38.331.

In one embodiment, the second information comprises a ControlResourceSetZero in TS 38.331.

In one embodiment, the second information comprises configuration information for a Search Space.

In one embodiment, the second information comprises a SearchSpace in TS 38.331.

In one embodiment, the second information comprises a SearchSpaceId in TS 38.331.

In one embodiment, the second information comprises a SearchSpaceZero in TS 38.331.

In one embodiment, the second information comprises configuration information for a Transceiver Control Interface (TCI).

In one embodiment, a physical layer channel bearing the target signal comprises a Physical Downlink Shared Channel (PDSCH).

In one embodiment, a physical layer channel bearing the target signal comprises a Physical Uplink Shared Channel (PUSCH).

In one embodiment, a transport channel bearing the target signal comprises a Downlink Shared Channel (DL-SCH).

In one embodiment, a transport channel bearing the target signal comprises an Uplink Shared Channel (UL-SCH).

In one embodiment, the second information comprises a TCI-State in TS 38.331.

In one embodiment, the second information comprises a TCI-StateId in TS 38.331.

In one embodiment, the second information comprises configuration information related to a Bandwidth Part (BWP).

In one embodiment, the second information comprises a BWP in TS 38.331.

In one embodiment, the second information comprises a BWP-Downlink in TS 38.331.

In one embodiment, the second information comprises a BWP-DownlinkCommon in TS 38.331.

In one embodiment, the second information comprises a BWP-DownlinkDedicated in TS 38.331.

In one embodiment, the second information comprises a BWP-Id in TS 38.331.

In one embodiment, the second information comprises a BWP-Uplink in TS 38.331.

In one embodiment, the second information comprises a BWP-UplinkCommon in TS 38.331.

In one embodiment, the second information comprises a BWP-UplinkDedicated in TS 38.331.

In one embodiment, the second information comprises information for Configured Grant.

In one embodiment, the second information comprises ConfiguredGrantConfig in TS 38.331.

In one embodiment, when the second time window is one of the K1 time windows, the first node assumes that a transmitter for the first information and a transmitter for the second information are the same.

In one embodiment, when the second time window is one of the K1 time windows, the first node assumes that a transmitter for the first information and a transmitter for the second information are co-located.

In one embodiment, when the second time window is one of the K1 time windows, the first node assumes that a transmitter for the first information and a transmitter for the second information are a same satellite.

In one embodiment, the first information comprises information for a traveling orbit of a transmitter for the first information.

In one embodiment, the first information comprises information for a calendar of a transmitter for the first information.

In one embodiment, the first information comprises information for an Ephemeris of a transmitter for the first information.

In one embodiment, the target time-frequency resource set occupies a positive integer number of Resource Elements (REs).

In one embodiment, the target time-frequency resource set occupies a positive integer number of multicarrier symbol(s) in time domain, and a positive integer number of sub-carrier(s) in frequency domain.

In one embodiment, the RE in the present disclosure occupies a multicarrier symbol in time domain, and a subcarrier in frequency domain.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is an OFDM symbol containing Cyclic Prefix (CP).

In one embodiment, the multicarrier symbol in the present disclosure is a Discrete Fourier Transform Spreading Orthogonal Frequency Division Multiplexing (DFT-s-OFDM) symbol containing CP.

In one embodiment, the phrase that any two of the K1 time windows are orthogonal comprises a meaning that there isn't a multicarrier symbol belonging to any two time windows among the K1 time windows at the same time.

Embodiment 2

Figure 2:
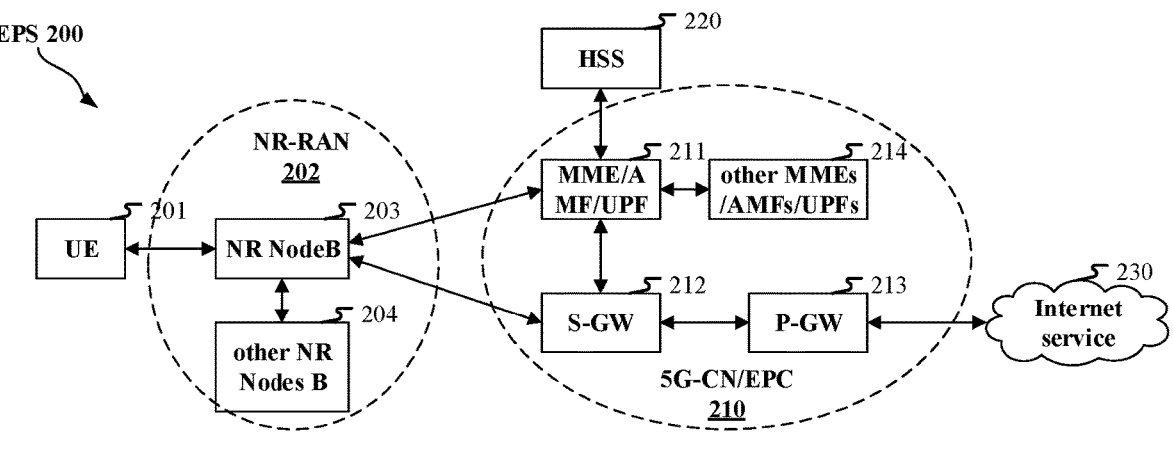
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LIE-A) systems. The 5G NR or LIE network architecture 200 may be called an Evolved Packet System (EPS) 200 or other suitable terminology. The EPS 200 may comprise one or more UEs 201, an NG-RAN 202, a Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the gNB203 corresponds to the second node in the present disclosure.

In one embodiment, an air interface between the UE201 and the gNB203 is a Uu interface.

In one embodiment, a radio link between the UE201 and the gNB203 is a cellular link.

In one embodiment, a radio link between the gNB203 and a terrestrial station is a Feeder Link.

In one embodiment, the first node in the present disclosure is a terminal within the coverage of the gNB203.

In one embodiment, the UE 201 supports transmissions in NTN.

In one embodiment, the UE 201 supports transmissions in large-delay networks.

In one embodiment, the gNB203 supports transmissions in NTN.

In one embodiment, the gNB203 supports transmissions in large-delay networks.

In one embodiment, the first node has the capability of Global Positioning System (GPS).

In one embodiment, the first node has the capability of Global Navigation Satellite System (GNSS).

In one embodiment, the first node has the capability of BeiDou Navigation Satellite System (BDS).

In one embodiment, the first node has the capability of Galileo Satellite Navigation System (GALILEO).

Embodiment 3

Figure 3:
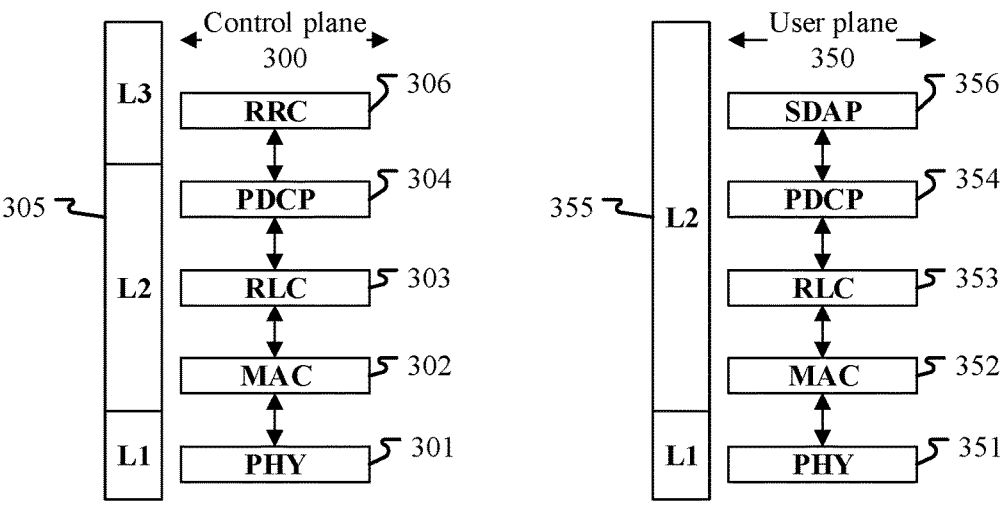
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X) is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP304 of the second communication node is used for generating scheduling of the first communication node.

In one embodiment, the PDCP354 of the second communication node is used for generating scheduling of the first communication node.

In one embodiment, the first information is generated by the MAC 352, or the MAC 302.

In one embodiment, the first information is generated by the RRC 306.

In one embodiment, the second information is generated by the MAC 352, or the MAC 302.

In one embodiment, the second information is generated by the RRC 306.

In one embodiment, the target signal is generated by the PHY 301, or the PHY 351.

In one embodiment, the target signal is generated by the MAC 352, or the MAC 302.

In one embodiment, the first signal is generated by the PHY 301, or the PHY 351.

In one embodiment, the second signal is generated by the PHY 301, or the PHY 351.

In one embodiment, what triggers transmission of the second signal is a Serving Mobile Location Centre (SMLC).

In one embodiment, what triggers transmission of the second signal is an E-SMLC.

In one embodiment, what triggers transmission of the second signal is a SUPL Location Platform (SLP); herein, SUPL refers to Secure User Plane Location.

In one embodiment, what triggers transmission of the second signal is a Location Measurement Unit (LMU).

In one embodiment, operations triggering transmission of the second signal are from a core network.

In one embodiment, the third signal is generated by the PHY 301, or the PHY 351.

In one embodiment, the third signal is generated by the MAC 352, or the MAC 302.

In one embodiment, the fourth signal is generated by the PHY 301, or the PHY 351.

In one embodiment, the fourth signal is generated by the MAC 352, or the MAC 302.

Embodiment 4

Figure 4:
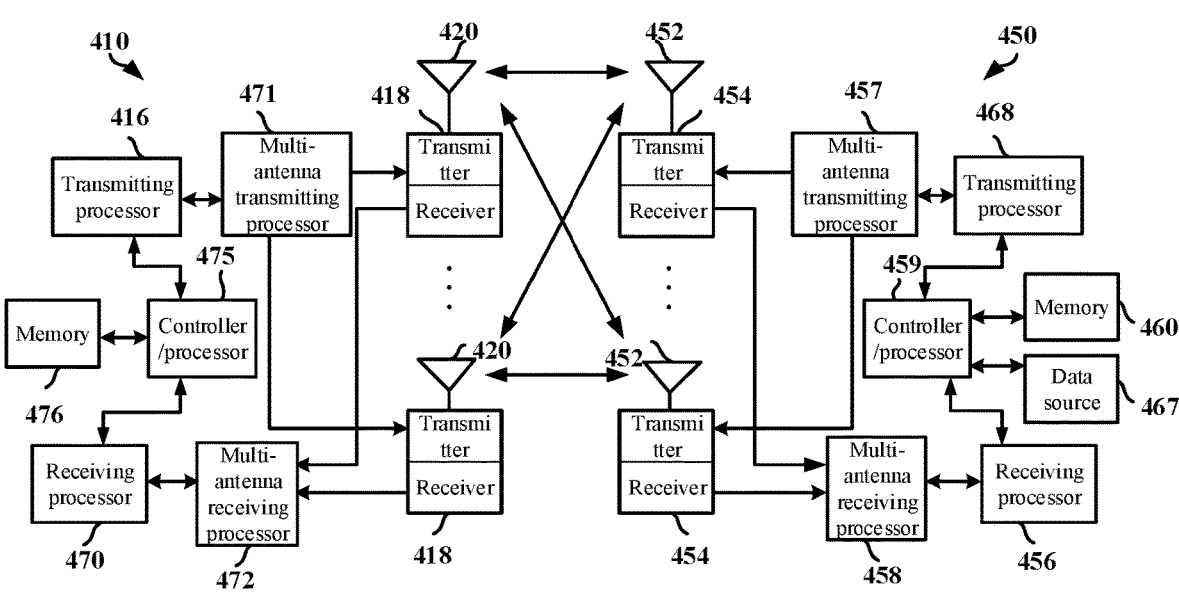
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG.

4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also responsible for a retransmission of a lost packet, and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also in charge of a retransmission of a lost packet and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives first information in a first time window, the first information being used to determine a first time interval length; receives second information in a second time window; and first-operates a target signal in a target time-frequency resource set; the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal; the first-operating is receiving, or the first-operating is transmitting.

In one embodiment, the first communication device 450 comprises a memory that stores computer readable instruction program, the computer readable instruction program generates an action when executed by at least one processor, which includes: receiving first information in a first time window, the first information being used to determine a first time interval length; receiving second information in a second time window; and first-operating a target signal in a target time-frequency resource set; the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal; the first-operating is receiving, or the first-operating is transmitting.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits first information in a first time window, the first information being used to determine a first time interval length; transmits second information in a second time window; and second-operates a target signal in a target time-frequency resource set; the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal; the second-operating is transmitting, or the second-operating is receiving.

In one embodiment, the second communication device 410 comprises a memory that stores computer readable instruction program, the computer readable instruction program generates an action when executed by at least one processor, which includes: transmitting first information in a first time window, the first information being used to determine a first time interval length; transmitting second information in a second time window; and second-operating a target signal in a target time-frequency resource set; the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal; the second-operating is transmitting, or the second-operating is receiving.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a terrestrial terminal.

In one embodiment, the first communication device 450 is a terrestrial device.

In one embodiment, the first communication device 450 is a low-earth terminal.

In one embodiment, the first communication device 450 is an airplane.

In one embodiment, the first communication device 450 is an aircraft.

In one embodiment, the first communication device 450 is a means of transportation by water.

In one embodiment, the second communication device 410 is a base station.

In one embodiment, the second communication device 410 is a non-terrestrial base station.

In one embodiment, the second communication device 410 is a Geostationary Earth Orbiting (GEO) satellite.

In one embodiment, the second communication device 410 is a Medium Earth Orbiting (MEO) satellite.

In one embodiment, the second communication device 410 is a Low Earth Orbit (LEO) satellite.

In one embodiment, the second communication device 410 is a Highly Elliptical Orbiting (HEO) satellite.

In one embodiment, the second communication device 410 is an Airborne Platform.

In one embodiment, at least the first four of the antenna 452, the receiver 454, the multi-antenna receiving processor 458, the receiving processor 456 and the controller/processor 459 are used for receiving first information in a first time window, the first information being used to determine a first time interval length; at least the first four of the antenna 420, the transmitter 418, the multi-antenna transmitting processor 471, the transmitting processor 416 and the controller/processor 475 are used for transmitting first information in a first time window, the first information being used to determine a first time interval length.

In one embodiment, at least the first four of the antenna 452, the receiver 454, the multi-antenna receiving processor 458, the receiving processor 456 and the controller/processor 459 are used for receiving second information in a second time window; at least the first four of the antenna 420, the transmitter 418, the multi-antenna transmitting processor 471, the transmitting processor 416 and the controller/processor 475 are used for transmitting second information in a second time window.

In one embodiment, at least the first four of the antenna 452, the receiver 454, the multi-antenna receiving processor 458, the receiving processor 456 and the controller/processor 459 are used for receiving a target signal in a target time-frequency resource set; at least the first four of the antenna 420, the transmitter 418, the multi-antenna transmitting processor 471, the transmitting processor 416 and the controller/processor 475 are used for transmitting a target signal in a target time-frequency resource set.

In one embodiment, at least the first four of the antenna 452, the transmitter 454, the multi-antenna transmitting processor 457, the transmitting processor 468, and the controller/processor 459 are used for transmitting a target signal in a target time-frequency resource set; at least the first four of the antenna 420, the receiver 418, the multi-antenna receiving processor 472, the receiving processor 470 and the controller/processor 475 are used for receiving a target signal in a target time-frequency resource set.

In one embodiment, at least the first four of the antenna 452, the receiver 454, the multi-antenna receiving processor 458, the receiving processor 456, or the controller/processor 459 are used for receiving a first signal; at least the first four of the antenna 420, the transmitter 418, the multi-antenna transmitting processor 471, the transmitting processor 416 and the controller/processor 475 are used for transmitting a first signal.

In one embodiment, at least the first four of the antenna 452, the receiver 454, the multi-antenna receiving processor 458, the receiving processor 456, or the controller/processor 459 are used for receiving a second signal; at least the first four of the antenna 420, the transmitter 418, the multi-antenna transmitting processor 471, the transmitting processor 416 and the controller/processor 475 are used for transmitting a second signal.

In one embodiment, at least the first four of the antenna 452, the receiver 454, the multi-antenna receiving processor 458, the receiving processor 456 and the controller/processor 459 are used for receiving a third signal in a second time-frequency resource set; at least the first four of the antenna 420, the transmitter 418, the multi-antenna transmitting processor 471, the transmitting processor 416 and the controller/processor 475 are used for transmitting a third signal in a second time-frequency resource set.

In one embodiment, at least the first four of the antenna 452, the transmitter 454, the multi-antenna transmitting processor 457, the transmitting processor 468, and the controller/processor 459 are used for transmitting a third signal in a second time-frequency resource set; at least the first four of the antenna 420, the receiver 418, the multi-antenna receiving processor 472, the receiving processor 470 and the controller/processor 475 are used for receiving a third signal in a second time-frequency resource set.

In one embodiment, at least the first four of the antenna 452, the receiver 454, the multi-antenna receiving processor 458, the receiving processor 456 and the controller/processor 459 are used for receiving a fourth signal in a third time-frequency resource set; at least the first four of the antenna 420, the transmitter 418, the multi-antenna transmitting processor 471, the transmitting processor 416 and the controller/processor 475 are used for transmitting a fourth signal in a third time-frequency resource set.

In one embodiment, at least the first four of the antenna 452, the transmitter 454, the multi-antenna transmitting processor 457, the transmitting processor 468, and the controller/processor 459 are used for transmitting a fourth signal in a third time-frequency resource set; at least the first four of the antenna 420, the receiver 418, the multi-antenna receiving processor 472, the receiving processor 470 and the controller/processor 475 are used for receiving a fourth signal in a third time-frequency resource set.

Embodiment 5

Figure 5:
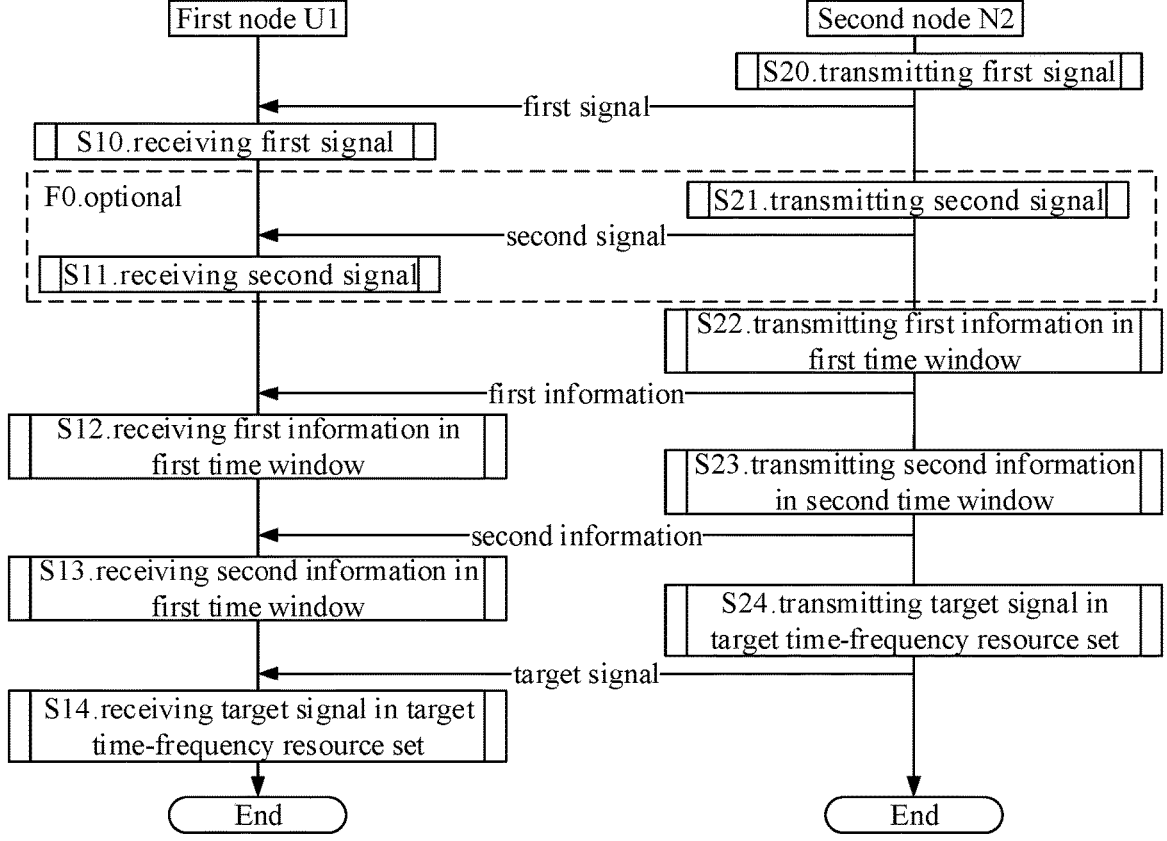
FIG. 5 illustrates a flowchart of first information according to one embodiment of the present disclosure.

Embodiment 5 illustrates a flowchart of first information, as shown in FIG. 5. In FIG. 5, a first node U1 and a second node N2 are in communication via a radio link; herein, steps marked by the box 0 are optional.

The first node U1 receives a first signal in step S10; and receives a second signal in step S11; receives first information in a first time window in step S12; receives second information in a second time window in step S13; and receives a target signal in a target time-frequency resource set in step S14.

The second node N2 transmits a first signal in step S20; and transmits a second signal in step S21; transmits first information in a first time window in step S22; transmits second information in a second time window in step S23; and transmits a target signal in a target time-frequency resource set in step S24.

In Embodiment 5, the first information is used to determine a first time interval length; the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal; the first signal is used to determine a synchronization timing for the K1 time windows; the second signal is used to determine positional information for the first node U1.

In one embodiment, the first information is used to determine a first parameter group, the first parameter group is used to determine the first time interval length, and the first parameter group comprises at least one of a type corresponding to second node N2, a height of the second node N2, or a moving speed and direction of the second node N2.

In one subembodiment, the first parameter group comprises a type corresponding to the second node N2.

In one subembodiment, a type corresponding to the second node N2 is one of GEO Satellite, MEO Satellite, LEO Satellite, HEO Satellite or Airborne Platform.

In one subembodiment, the first parameter group comprises a height of the second node N2.

In one subembodiment, the first parameter group comprises a moving speed and direction of the second node N2.

In one subembodiment, the first parameter group is used to determine L1 candidate time values, the first time interval length being one of the L1 candidate time values, the first information is used to indicate the first time interval length from the L1 candidate time values, L1 being a positive integer greater than 1.

In one subembodiment, duration time of any time window of the K1 time windows in time domain is equal to a first time value.

In one subembodiment, the first time value is measured in milliseconds.

In one subembodiment, the first time value is equal to a positive integer number of milliseconds.

In one subembodiment, the first time value is related to the first parameter group.

In one embodiment, the first signal comprises a Primary Synchronization Signal (PSS).

In one embodiment, the first signal comprises a Secondary Synchronization Signal (SSS).

In one embodiment, the first signal comprises an SSB.

In one embodiment, the first signal is used by the first node for downlink synchronization.

In one embodiment, the first signal is used to determine a System Frame Number (SFN) of the system, a position of each of the K1 time windows in time domain is determined according to the SFN of the system.

In one embodiment, the first time interval length is related to the positional information for the first node U1.

In one embodiment, the second signal is a GPS signal.

In one embodiment, the second signal is used by the first node for positioning.

In one embodiment, the second signal is a Beidou signal.

In one embodiment, the second signal is a signal sent from a GALILEO system.

In one embodiment, the positional information and the first parameter group are jointly used to determine the first time interval length.

In one embodiment, the positional information is used to determine L2 candidate time values, the first time interval length being one of the L2 candidate time values, the first information is used to indicate the first time interval length from the L2 candidate time values, L2 being a positive integer greater than 1.

In one embodiment, the second signal is a Positioning Reference Signal (PRS).

In one embodiment, the target signal comprises a CSI-RS.

In one embodiment, the target signal comprises a DM-RS.

In one embodiment, the target signal comprises a PDCCH.

In one embodiment, the target signal comprises an SSB.

In one embodiment, the target signal comprises a PT-RS.

Embodiment 6

Figure 6:
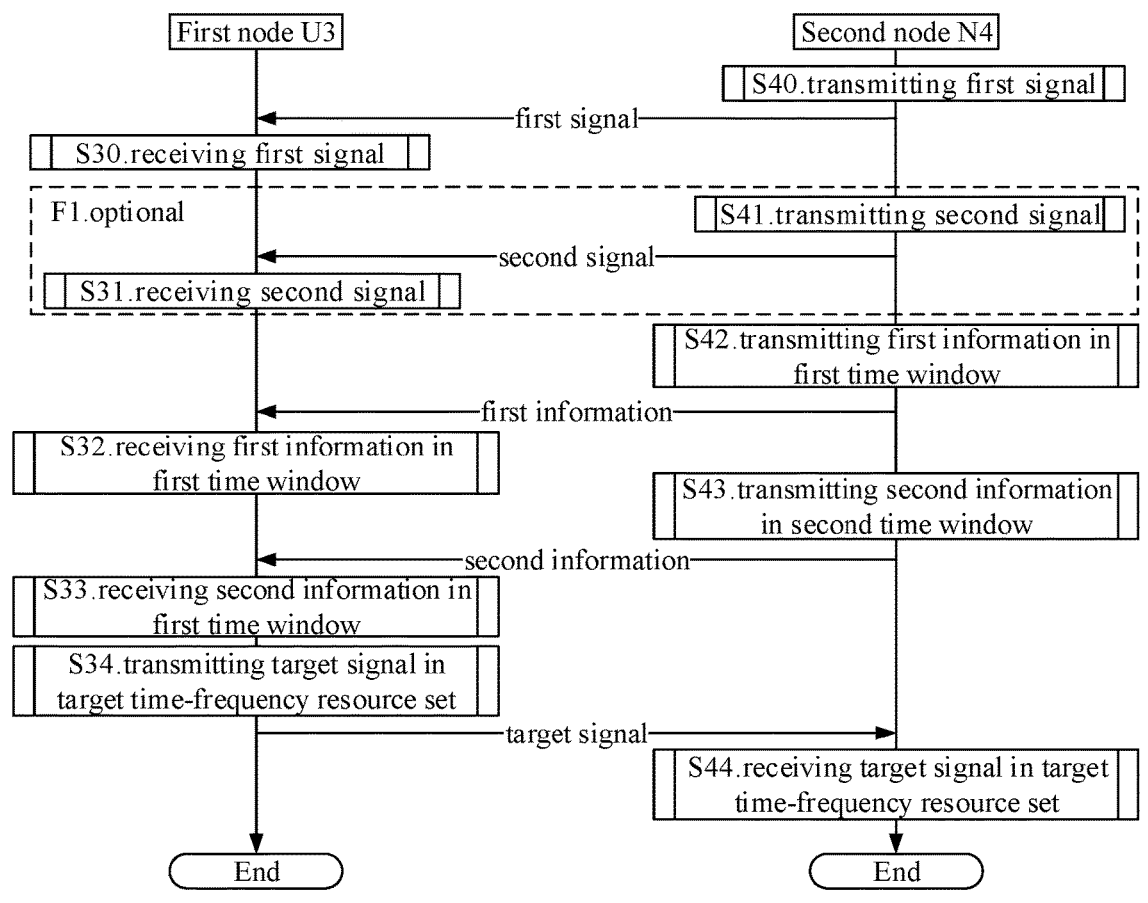
FIG. 6 illustrates a flowchart of first information according to one embodiment of the present disclosure.

Embodiment 6 illustrates another flowchart of first information, as shown in FIG. 6. In FIG. 6, a first node U3 and a second node N4 are in communication via a radio link; herein, steps marked by the box 1 are optional. In case of no conflict, the subembodiments and subsidiary embodiments in Embodiment 5 are also applicable to Embodiment 6; similarly, the embodiments in Embodiment 6 are applicable to Embodiment 5.

The first node U3 receives a first signal in step S30; and receives a second signal in step S31; receives first information in a first time window in step S32; receives second information in a second time window in step S33; and transmits a target signal in a target time-frequency resource set in step S34.

The second node N4 transmits a first signal in step S40; and transmits a second signal in step S41; transmits first information in a first time window in step S42; transmits second information in a second time window in step S43; and receives a target signal in a target time-frequency resource set in step S44.

In Embodiment 6, the first information is used to determine a first time interval length; the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal; the first signal is used to determine a synchronization timing for the K1 time windows; the second signal is used to determine positional information for the first node U1.

In one embodiment, the target signal comprises an SRS.

In one embodiment, the target signal comprises a PRACH.

In one embodiment, the target signal comprises a Physical Uplink Control Channel (PUCCH).

In one embodiment, the target signal comprises a PUSCH.

Embodiment 7

Figure 7:
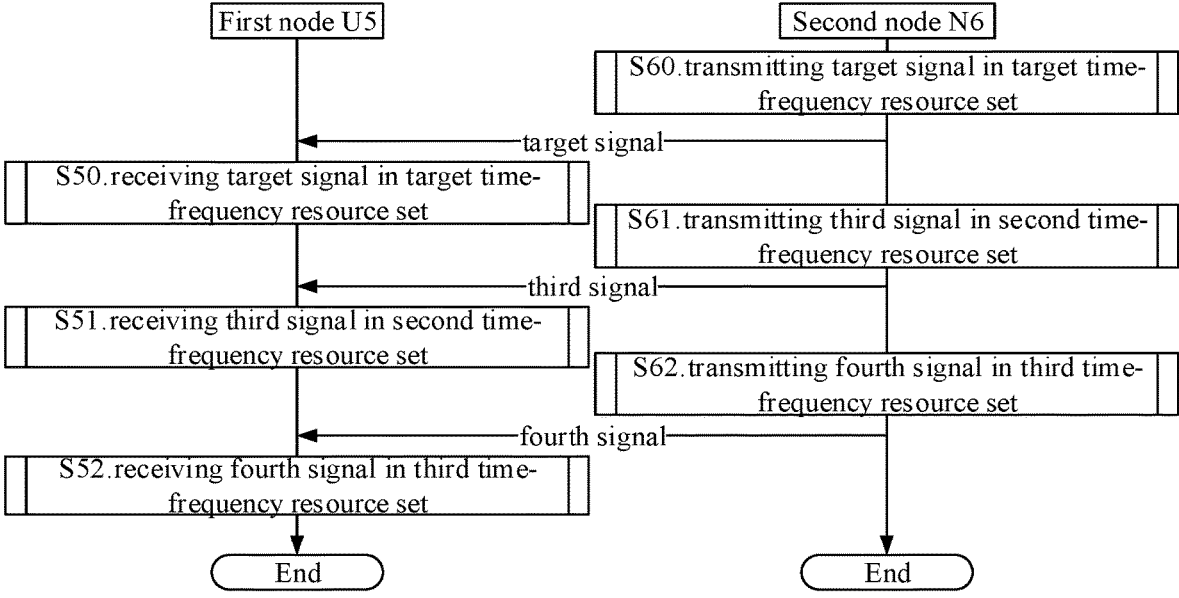
FIG. 7 illustrates a flowchart of a target signal according to one embodiment of the present disclosure.

Embodiment 7 illustrates another flowchart of a target signal according to one embodiment of the present disclosure, as shown in FIG. 7. In FIG. 7, a first node U5 and a second node N6 are in communication via a radio link. In case of no conflict, the subembodiments and subsidiary embodiments in Embodiment 5, Embodiment 6 and Embodiment 7 are mutually applicable.

The first node U5 receives a target signal in a target time-frequency resource set in step S50, receives a third signal in a second time-frequency resource set in step S51, and receives a fourth signal in a third time-frequency resource set in step S52.

The second node N6 transmits a target signal in a target time-frequency resource set in step S60, transmits a third signal in a second time-frequency resource set in step S61, and transmits a fourth signal in a third time-frequency resource set in step S62.

In Embodiment 7, a time-domain resource occupied by the second time-frequency resource set belongs to one of the K1 time windows, the third signal and the target signal are spatially correlated; a time-domain resource occupied by the third time-frequency resource set belongs to a time window outside the K1 time windows, the fourth signal and the target signal are spatially uncorrelated.

In one embodiment, the phrase that the third signal and the target signal are spatially correlated includes a meaning that spatial Rx parameters for the third signal can be inferred from spatial Rx parameters for the target signal.

In one embodiment, the target signal, the third signal and the fourth signal all comprise a CSI-RS.

In one subembodiment, a CSI obtained according to the target signal and a CSI obtained according to the third signal can be averaged.

In one subembodiment, a CSI obtained according to the target signal and a CSI obtained according to the fourth signal cannot be averaged.

In one embodiment, the target signal, the third signal and the fourth signal all comprise a DM-RS.

In one subembodiment, a channel estimation result obtained according to the target signal and a channel estimation result obtained according to the third signal can be averaged.

In one subembodiment, a channel estimation result obtained according to the target signal and a channel estimation result obtained according to the fourth signal cannot be averaged.

In one embodiment, the target signal and the third signal are QCL with a first reference signal, and the fourth signal is non-QCL with the first reference signal.

Embodiment 8

Embodiment 8 illustrates another flowchart of a target signal according to one embodiment of the present disclosure, as shown in FIG. 8. In FIG. 8, a first node U7 and a second node N8 are in communication via a radio link. In case of no conflict, the subembodiments and subsidiary embodiments in Embodiment 5, Embodiment 6 and Embodiment 8 are mutually applicable.

The first node U7 receives a target signal in a target time-frequency resource set in step S70, transmits a third signal in a second time-frequency resource set in step S71, and transmits a fourth signal in a third time-frequency resource set in step S72.

The second node N8 transmits a target signal in a target time-frequency resource set in step S80, receives a third signal in a second time-frequency resource set in step S81, and receives a fourth signal in a third time-frequency resource set in step S82.

In Embodiment 8, a time-domain resource occupied by the second time-frequency resource set belongs to one of the K1 time windows, the third signal and the target signal are spatially correlated; a time-domain resource occupied by the third time-frequency resource set belongs to a time window outside the K1 time windows, the fourth signal and the target signal are spatially uncorrelated.

In one embodiment, the phrase that the third signal and the target signal are spatially correlated includes a meaning that spatial Tx parameters for the third signal can be inferred from spatial Rx parameters for the target signal.

In one embodiment, the target signal comprises a CSI-RS, while the third signal and the fourth signal both comprise an SRS.

In one embodiment, the target signal comprises an SSB, while the third signal and the fourth signal both comprise a PRACH.

In one embodiment, the target signal comprises a CSI-RS, while the third signal and the fourth signal both comprise a PUSCH.

In one embodiment, the target signal comprises a CSI-RS, while the third signal and the fourth signal both comprise a PUCCH.

In one subembodiment of the above four embodiments, spatial Rx parameters for the target signal are used to determine a transmission antenna port for the third signal.

In one subembodiment of the above four embodiments, spatial Rx parameters for the target signal aren't used to determine a transmission antenna port for the fourth signal.

In one embodiment, the target signal comprises a PDCCH, while the third signal and the fourth signal both comprise a PUSCH.

In one subembodiment, a CORESET in which the target signal is comprised is used to determine a transmission antenna port for the third signal.

In one subembodiment, a CORESET in which the target signal is comprised is not used to determine a transmission antenna port for the fourth signal.

In one embodiment, the target signal and the third signal are QCL with a first reference signal, and the fourth signal is non-QCL with the first reference signal.

Embodiment 9

Embodiment 9 illustrates another flowchart of a target signal according to one embodiment of the present disclosure, as shown in FIG. 9. In FIG. 9, a first node U9 and a second node N10 are in communication via a radio link. In case of no conflict, the subembodiments and subsidiary embodiments in Embodiment 5, Embodiment 6 and Embodiment 9 are mutually applicable.

The first node U9 transmits a target signal in a target time-frequency resource set in step S90, receives a third signal in a second time-frequency resource set in step S91, and receives a fourth signal in a third time-frequency resource set in step S92.

The second node N10 receives a target signal in a target time-frequency resource set in step S100, transmits a third signal in a second time-frequency resource set in step S101, and transmits a fourth signal in a third time-frequency resource set in step S102.

In Embodiment 9, a time-domain resource occupied by the second time-frequency resource set belongs to one of the K1 time windows, the third signal and the target signal are spatially correlated; a time-domain resource occupied by the third time-frequency resource set belongs to a time window outside the K1 time windows, the fourth signal and the target signal are spatially uncorrelated.

In one embodiment, the phrase that the third signal and the target signal are spatially correlated includes a meaning that spatial Rx parameters for the third signal can be inferred from spatial Tx parameters for the target signal.

In one embodiment, the target signal comprises a PRACH, while the third signal and the fourth signal both comprise a PDCCH.

In one subembodiment, a time-frequency resource where the target signal is located is used to determine spatial Rx parameters for the third signal.

In one subembodiment, a time-frequency resource where the target signal is located is used to determine a CORESET occupied by the third signal.

In one subembodiment, a time-frequency resource where the target signal is located is not used to determine spatial Rx parameters for the fourth signal.

In one subembodiment, a time-frequency resource where the target signal is located is not used to determine a CORESET occupied by the fourth signal.

In one embodiment, the target signal comprises a PUCCH, while the third signal and the fourth signal both comprise a PDCCH.

In one embodiment, the target signal comprises a PUSCH, while the third signal and the fourth signal both comprise a PDCCH.

In one embodiment, the target signal comprises an SRS, while the third signal and the fourth signal both comprise a PDCCH.

In one subembodiment of the above three embodiments, a transmission antenna port employed by the target signal is used to determine a CORESET occupied by the third signal.

In one subembodiment of the above three embodiments, a transmission antenna port employed by the target signal is not used to determine a CORESET occupied by the fourth signal.

In one embodiment, the target signal and the third signal are QCL with a first reference signal, and the fourth signal is non-QCL with the first reference signal.

Embodiment 10

Figure 10:
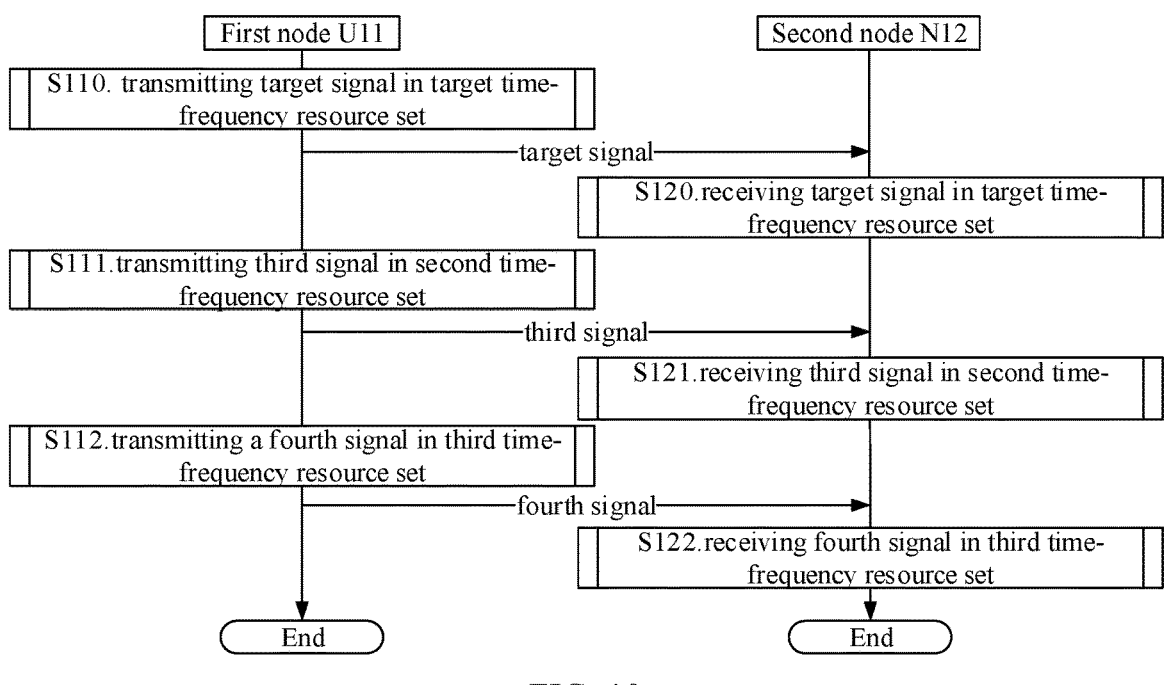
FIG. 10 illustrates a flowchart of a target signal according to one embodiment of the present disclosure.

Embodiment 10 illustrates another flowchart of a target signal according to one embodiment of the present disclosure, as shown in FIG. 10. In FIG. 10, a first node U11 and a second node N12 are in communication via a radio link. In case of no conflict, the subembodiments and subsidiary embodiments in Embodiment 5, Embodiment 6 and Embodiment 10 are mutually applicable.

The first node U11 transmits a target signal in a target time-frequency resource set in step S110, transmits a third signal in a second time-frequency resource set in step S111, and transmits a fourth signal in a third time-frequency resource set in step S112.

The second node N12 receives a target signal in a target time-frequency resource set in step S120, receives a third signal in a second time-frequency resource set in step S121, and receives a fourth signal in a third time-frequency resource set in step S122.

In Embodiment 10, a time-domain resource occupied by the second time-frequency resource set belongs to one of the K1 time windows, the third signal and the target signal are spatially correlated; a time-domain resource occupied by the third time-frequency resource set belongs to a time window outside the K1 time windows, the fourth signal and the target signal are spatially uncorrelated.

In one embodiment, the phrase that the third signal and the target signal are spatially correlated includes a meaning that spatial Tx parameters for the third signal can be inferred from spatial Tx parameters for the target signal.

In one embodiment, the target signal comprises a PRACH, while the third signal and the fourth signal both comprise an SRS.

In one embodiment, the target signal comprises a PRACH, while the third signal and the fourth signal both comprise a PUCCH.

In one embodiment, the target signal comprises a PRACH, while the third signal and the fourth signal both comprise a PUSCH.

In one subembodiment of the above two embodiments, a time-frequency resource where the target signal is located is used to determine spatial Rx parameters for the third signal.

In one subembodiment of the above two embodiments, a time-frequency resource where the target signal is located is used to determine a time-frequency resource occupied by the third signal.

In one subembodiment of the above two embodiments, a time-frequency resource where the target signal is located is not used to determine spatial Rx parameters for the fourth signal.

In one subembodiment of the above two embodiments, a time-frequency resource where the target signal is located is not used to determine a time-frequency resource occupied by the fourth signal.

In one embodiment, the spatial Tx parameters in the present disclosure include one of a transmission analog beamforming vector, a transmission beamforming vector or a transmission analog beamforming matrix.

In one embodiment, the spatial Rx parameters in the present disclosure include one of a reception analog beamforming vector, a reception beamforming vector or a reception analog beamforming matrix.

Embodiment 11

Figure 11:
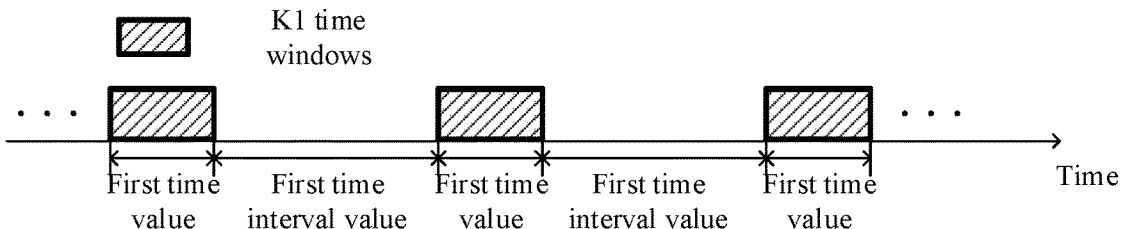
FIG. 11 illustrates a schematic diagram of K1 time windows according to one embodiment of the present disclosure.

Embodiment 11 illustrates a schematic diagram of K1 time windows according to one embodiment of the present disclosure, as shown in FIG. 11. In FIG. 11, the K1 time windows are discrete in time domain; the box filled with oblique lines in the figure represents a time window among the K1 time windows.

In one embodiment, duration time of any time window of the K1 time windows is equal to a first time value.

In one embodiment, a time interval between any two adjacent time windows among the K1 time windows is equal to a first time interval length.

Embodiment 12

Figure 12:
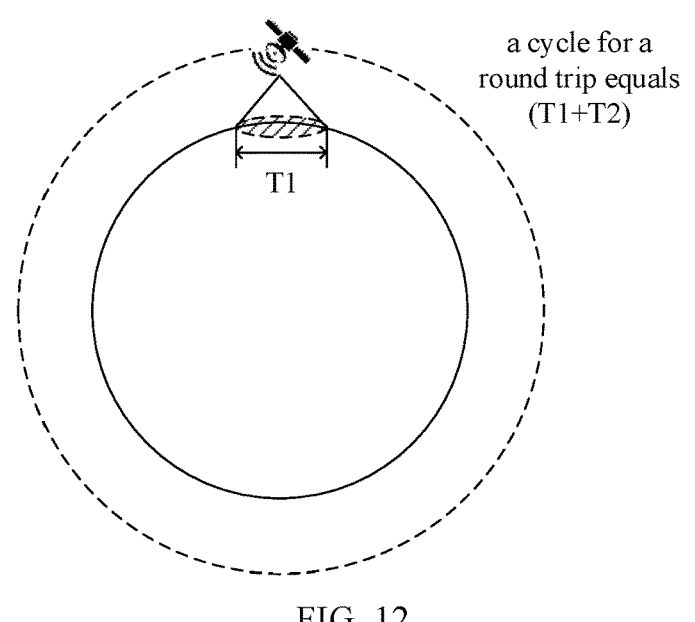
FIG. 12 illustrates a schematic diagram of a second time window according to one embodiment of the present disclosure.

Embodiment 12 illustrates a schematic diagram of a second time window according to one embodiment of the present disclosure, as shown in FIG. 12. In FIG. 12, a time-domain resource occupied by the target time-frequency resource belongs to a target time window, the target time window being one of the K1 time windows; the second node provides services for a zone located by the first node within the target time window, and a cycle for the second node traveling around the earth is equal to T, T being equal to a sum of T1 and T2 in the present disclosure, where T1 is equal to the first time value, while T2 is equal to the first time interval value; the dotted-line circle in FIG. 12 symbolizes an orbit of the second node; the shadow in the ellipse symbolizes a coverage area of the second node within a duration of the first time value.

In one embodiment, the T is measured in seconds.

In one embodiment, the second node generates Q1 beam spots as it travels around the earth, with the first node located in one of the Q1 beam spots, the second node provides services for the beam spot where the first node is located for a time duration equal to a first time value; Q1 is a positive integer greater than 1.

In one embodiment, the first node keeps dual connectivity with the second node and the third node.

In one embodiment, a Secondary Cell Group (SCG) for the first node comprises the second node.

Embodiment 13

Embodiment 13 illustrates a schematic diagram of spatial correlation according to one embodiment of the present disclosure, as shown in FIG. 13. In FIG. 13, the target signal is transmitted in a target time-frequency resource, the target time-frequency resource belonging to a target time window; the third signal is transmitted in a second time-frequency resource, the second time-frequency resource belonging to a third time window; the fourth signal is transmitted in a third time-frequency resource, the third time-frequency resource belonging to a fourth time window; the target time window is one of the K1 time windows, the third time window is one of the K1 time windows, and the fourth time window is one of the K1 time windows; the target signal corresponds to a first beam, the third signal corresponds to a second beam, and the fourth signal corresponds to a third beam; the third signal is spatially correlated to the target signal, while the fourth signal is spatially non-correlated to the target signal.

In one embodiment, the phrase that the third signal and the target signal are spatially correlated includes a meaning that the third signal and the target signal are transmitted employing a same antenna port.

In one embodiment, the phrase that the third signal and the target signal are spatially correlated includes a meaning that the third signal and the target signal are associated with a same reference signal.

In one embodiment, the phrase that the third signal and the target signal are spatially correlated includes a meaning that a same reference signal can be adopted to demodulate the third signal and the target signal.

In one embodiment, the second time-frequency resource set occupies a positive integer number of Resource Element (s) (RE(s)).

In one embodiment, the second time-frequency resource set occupies a positive integer number of multicarrier symbol(s) in time domain, and a positive integer number of sub-carrier(s) in frequency domain.

In one embodiment, the third time-frequency resource set occupies a positive integer number of Resource Element(s) (RE(s)).

In one embodiment, the third time-frequency resource set occupies a positive integer number of multicarrier symbol(s) in time domain, and a positive integer number of sub-carrier (s) in frequency domain.

In one embodiment, the phrase that the fourth signal and the target signal are spatially uncorrelated includes a meaning that the fourth signal and the target signal are non-QCL.

In one embodiment, the first beam and the second beam are QCL.

In one embodiment, the first beam and the third beam are non-QCL.

Embodiment 14

Embodiment 14 illustrates a structure block diagram of a first node, as shown in FIG. 14. In FIG. 14, a first node 1400 is comprised of a first receiver 1401, a second receiver 1402 and a first transceiver 1403.

The first receiver 1401 receives first information in a first time window, the first information being used to determine a first time interval length;

the second receiver 1402 receives second information in a second time window; and the first transceiver 1403 receives a target signal in a target time-frequency resource set, or transmits a target signal in a target time-frequency resource set.

In Embodiment 14, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

In one embodiment, the first information is used to determine a first parameter group, the first parameter group is used to determine the first time interval length, and the first parameter group comprises at least one of a type corresponding to a transmitter for the first information, a height of a transmitter for the first information, or a moving speed and direction of a transmitter for the first information.

In one embodiment, duration time of any time window of the K1 time windows in time domain is equal to a first time value.

In one embodiment, the first time value is related to the first parameter group.

In one embodiment, the first receiver 1401 receives a first signal, the first signal being used to determine a synchronization timing for the K1 time windows.

In one embodiment, the first receiver 1401 receives a second signal, the second signal being used to determine positional information for the first node, the first time interval length being related to the positional information for the first node.

In one embodiment, the first time value is related to the positional information for the first node.

In one embodiment, the first transceiver 1403 receives a third signal in a second time-frequency resource set; a time-domain resource occupied by the second time-frequency resource set belongs to one of the K1 time windows, the third signal and the target signal are spatially correlated.

In one embodiment, the first transceiver 1403 transmits a third signal in a second time-frequency resource set; a time-domain resource occupied by the second time-frequency resource set belongs to one of the K1 time windows, the third signal and the target signal are spatially correlated.

In one embodiment, the first transceiver 1403 receives a fourth signal in a third time-frequency resource set; a time-domain resource occupied by the third time-frequency resource set belongs to a time window outside the K1 time windows, the fourth signal and the target signal are spatially uncorrelated.

In one embodiment, the first transceiver 1403 transmits a fourth signal in a third time-frequency resource set; a time-domain resource occupied by the third time-frequency resource set belongs to a time window outside the K1 time windows, the fourth signal and the target signal are spatially uncorrelated.

In one embodiment, the first receiver 1401 comprises at least the first four of the antenna 452, the receiver 454, the multi-antenna receiving processor 458, the receiving processor 456 and the controller/processor 459 in Embodiment 4.

In one embodiment, the second receiver 1402 comprises at least the first four of the antenna 452, the receiver 454, the multi-antenna receiving processor 458, the receiving processor 456 and the controller/processor 459 in Embodiment 4.

In one embodiment, the first transceiver 1403 comprises at least the first six of the antenna 452, the receiver/transmitter 454, the multi-antenna receiving processor 458, the receiving processor 456, the multi-antenna transmitting processor 457, the transmitting processor 468 and the controller/processor 459 in Embodiment 4.

Embodiment 15

Embodiment 15 illustrates a structure block diagram of a second node, as shown in FIG. 15. In FIG. 15, a second node 1500 is comprised of a first transmitter 1501, a second transmitter 1502 and a second transceiver 1503.

The first transmitter 1501 transmits first information in a first time window, the first information being used to determine a first time interval length;

the second transmitter 1502 transmits second information in a second time window; and the second transceiver 1503 transmits a target signal in a target time-frequency resource set, or receives a target signal in a target time-frequency resource set.

In Embodiment 15, the first time window is a time window of K1 time windows, and a time-domain resource occupied by the target time-frequency resource set belongs to one of the K1 time windows, K1 being a positive integer greater than 1; any two of the K1 time windows are orthogonal, the K1 time windows are arranged in a chronological order, a time interval length between any two time windows which are adjacent in time domain among the K1 time windows is equal to the first time interval length; when the second time window is one of the K1 time windows, the second information can be used to determine configuration information for the target signal, otherwise, the second information can only be used to determine configuration information for a signal other than the target signal.

In one embodiment, the first information is used to determine a first parameter group, the first parameter group is used to determine the first time interval length, and the first parameter group comprises at least one of a type corresponding to a transmitter for the first information, a height of a transmitter for the first information, or a moving speed and direction of a transmitter for the first information.

In one embodiment, duration time of any time window of the K1 time windows in time domain is equal to a first time value.

In one embodiment, the first transmitter 1501 transmits a first signal, the first signal being used to determine a synchronization timing for the K1 time windows.

In one embodiment, the first transmitter 1501 transmits a second signal, the second signal being used to determine positional information for the first node, the first time interval length being related to the positional information for the first node.

In one embodiment, the second transceiver 1503 transmits a third signal in a second time-frequency resource set; a time-domain resource occupied by the second time-frequency resource set belongs to one of the K1 time windows, the third signal and the target signal are spatially correlated.

In one embodiment, the second transceiver 1503 receives a third signal in a second time-frequency resource set; a time-domain resource occupied by the second time-frequency resource set belongs to one of the K1 time windows, the third signal and the target signal are spatially correlated.

In one embodiment, the second transceiver 1503 transmits a fourth signal in a third time-frequency resource set; a time-domain resource occupied by the third time-frequency resource set belongs to a time window outside the K1 time windows, the fourth signal and the target signal are spatially uncorrelated.

In one embodiment, the second transceiver 1503 receives a fourth signal in a third time-frequency resource set; a time-domain resource occupied by the third time-frequency resource set belongs to a time window outside the K1 time windows, the fourth signal and the target signal are spatially uncorrelated.

In one embodiment, the first transmitter 1501 comprises at least the first four of the antenna 420, the transmitter 418, the multi-antenna transmitting processor 471, the transmitting processor 416 and the controller/processor 475 in Embodiment 4.

In one embodiment, the second transmitter 1502 comprises at least the first four of the antenna 420, the transmitter 418, the multi-antenna transmitting processor 471, the transmitting processor 416 and the controller/processor 475 in Embodiment 4.

In one embodiment, the second transceiver 1503 comprises at least the first six of the antenna 420, the receiver/transmitter 418, the multi-antenna receiving processor 472, the receiving processor 470, the multi-antenna transmitting processor 471, the transmitting processor 416 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) for wireless communications, comprising:

a receiver configured to receive first radio resource control (RRC) signaling in a first time window of a plurality of K1 time windows arranged in a chronological order, the first RRC signaling being used to determine a first time interval length;

the receiver further configured to receive second RRC signaling in a second time window; and a transceiver configured to transmit or receive a phase tracking reference signal (PT-RS) in a target time-frequency resource set, and configured to receive or transmit a third signal in a second time-frequency resource set;

wherein a time interval length between any two time windows which are adjacent in time domain among the K1 time windows is equal to the first time interval length; wherein when the second time window is one of the K1 time windows, the second RRC signaling is used to determine configuration information for the PT-RS signal, otherwise, the second RRC signaling can only be used to determine configuration information for a signal other than the PT-RS signal, wherein a time-domain resource occupied by the second time-frequency resource set belongs to one of the K1 time windows, and wherein the third signal and the PT-RS are spatially correlated.

2. The UE according to claim 1, wherein the first RRC signaling is used to determine a first parameter group for determining the first time interval length, and wherein the first parameter group comprises at least one of a type corresponding to a transmitter for the first RRC signaling, a height of a transmitter for the first RRC signaling, or a moving speed and direction of a transmitter for the first RRC signaling.

3. The UE according to claim 1, wherein duration time of any time window of the K1 time windows in time domain is equal to a first time value.

4. The UE according to claim 1, wherein the receiver is further configured to receive a first signal used to determine a synchronization timing for the K1 time windows.

5. The UE according to claim 1, wherein the receiver is further configured to receive a second signal used to determine positional information for the UE, wherein the first time interval length is related to the positional information for the UE.

6. The UE according to claim 1, wherein the transceiver is further configured to receive or transmit a fourth signal in a third time-frequency resource set; wherein a time-domain resource occupied by the third time-frequency resource set belongs to a time window outside the K1 time windows, and wherein the fourth signal and the PT-RS are spatially uncorrelated.

7. The UE according to claim 1, wherein a first bit block is used for generating the PT-RS and a given signal, wherein the given signal being received in a time window among the K1 time windows other than a time window occupied by the PT-RS, wherein the PT-RS and the given signal can be combined; or, a first bit block is used for generating the PT-RS and a given signal, the given signal being transmitted in a time window among the K1 time windows other than a time window occupied by the PT-RS, the PT-RS and the given signal can be combined.

8. The UE according to claim 1, wherein a first bit block is used for generating the PT-RS and a given signal, wherein the given signal being received in a time window among the K1 time windows other than a time window occupied by the PT-RS, wherein the PT-RS and the given signal are quasi-collocated (QCL); or, a first bit block is used for generating the PT-RS and a given signal, the given signal being transmitted in a time window among the K1 time windows other than a time window occupied by the PT-RS, the PT-RS and the given signal are QCL.

9. The UE according to claim 1, wherein the second information comprises first sub-information and second sub-information, where the first sub-information is applied within the K1 time windows, while the second sub-information is applied outside the K1 time windows.

10. The UE according to claim 1, wherein when the second time window is one of the K1 time windows, the UE assumes that a transmitter for the first information and a transmitter for the second information are co-located.

11. A non-terrestrial network (NTN) node for wireless communications, comprising:

a transmitter configured to transmit first radio resource control (RRC) signaling in a first time window of a plurality of K1 time windows arranged in a chronological order, the first information being used by a user equipment (UE) receiving the RRC signaling to determine a first time interval length, the transmitter further configured to transmit second RRC signaling in a second time window; and a transceiver configured to receive or transmit a phase tracking reference signal (PT-RS) in a target time-frequency resource set, and transmit or receive a third signal in a second time-frequency resource set;

wherein the second RRC signaling is used to determine configuration information for the PT-RS, wherein a time-domain resource occupied by the second time-frequency resource set belongs to one of the K1 time windows, and wherein the third signal and the PT-RS are spatially correlated.

12. The NTN node according to claim 11, wherein the first RRC signaling is used to determine a first parameter group, the first parameter group is used to determine the first time interval length, and the first parameter group comprises at least one of a type corresponding to the NTN node, a height of the second node, or a moving speed and direction of the second node.

13. The NTN node according to claim 11, wherein duration time of any time window of the K1 time windows in time domain is equal to a first time value.

14. The NTN node according to claim 11, wherein the transmitter is further configured to transmit a first signal used to determine a synchronization timing for the K1 time windows.

15. The NTN node according to claim 11, wherein the transmitter is further configured to transmit a second signal used to determine positional information for the UE, wherein the first time interval length is related to the positional information for the UE.

16. The NTN node according to claim 11, wherein the transceiver is further configured to transmit or receive a fourth signal in a third time-frequency resource set; wherein a time-domain resource occupied by the third time-frequency resource set belongs to a time window outside the K1 time windows, and wherein the fourth signal and the PT-RS are spatially uncorrelated.

17. The NTN node according to claim 11, wherein a first bit block is used for generating the PT-RS and a given signal, the given signal being received in a time window among the K1 time windows other than a time window occupied by the PT-RS, the PT-RS and the given signal can be combined; or, a first bit block is used for generating the PT-RS and a given signal, the given signal being transmitted in a time window among the K1 time windows other than a time window occupied by the PT-RS, the PT-RS and the given signal can be combined; or, a first bit block is used for generating the PT-RS and a given signal, the given signal being received in a time window among the K1 time windows other than a time window occupied by the PT-RS, the PT-RS and the given signal are quasi-collocated (QCL); or, a first bit block is used for generating the PT-RS and a given signal, the given signal being transmitted in a time window among the K1 time windows other than a time window occupied by the PT-RS, the PT-RS and the given signal are QCL.

18. A method for wireless communications by a user equipment (UE), the method comprising:

receiving first radio resource control (RRC) signaling in a first time window of a plurality of K1 time windows arranged in a chronological order, the first RRC signaling being used to determine a first time interval length;

receiving second RRC signaling in a second time window;

receiving or transmitting a phase tracking reference signal (PT-RS) in a target time-frequency resource set; and receiving or transmitting a third signal in a second time-frequency resource set belonging to one of the K1 time windows, wherein when the second time window is one of the K1 time windows, the second RRC signaling is used to determine configuration information for the PT-RS signal, otherwise, the second RRC signaling can only be used to determine configuration information for a signal other than the PT-RS signal, and wherein the third signal and the PT-RS are spatially correlated.

* * * * *